United States Patent [19]

Pozzetti

[11] Patent Number: 4,756,126
[45] Date of Patent: Jul. 12, 1988

[54] METHOD FOR CONTROLLING THE MACHINING OF MECHANICAL PIECES

[75] Inventor: Mario Pozzetti, Bologna, Italy

[73] Assignee: Marposs Societa' Per Azioni, S. Marino di Bentivoglio, Italy

[21] Appl. No.: 939,095

[22] Filed: Dec. 8, 1986

[30] Foreign Application Priority Data

Dec. 18, 1985 [IT] Italy .................... 3651 A/85

[51] Int. Cl.⁴ ................................ B24B 1/00
[52] U.S. Cl. .................. 51/289 R; 51/105 R; 51/165 R
[58] Field of Search .......... 51/165 R, 105 SP, 105 R, 51/289 R

[56] References Cited

U.S. PATENT DOCUMENTS

| | | |
|---|---|---|
| 3,001,336 | 9/1961 | Bauer .................. 51/165 R |
| 3,057,186 | 10/1962 | Bluchowicz ............ 51/165 R |
| 3,877,151 | 4/1975 | Roberts ............... 51/105 SP |
| 4,455,789 | 6/1984 | Gehring . |
| 4,539,777 | 9/1985 | Brown ................. 51/165 R |
| 4,651,472 | 3/1987 | Scheder .............. 51/105 R |

FOREIGN PATENT DOCUMENTS 2060176 4/1981 United Kingdom .

*Primary Examiner*—Harold D. Whitehead
*Attorney, Agent, or Firm*—Stevens, Davis, Miller & Mosher

[57] ABSTRACT

The machining of mechanical pieces in a grinding machine is controlled depending on in-process and post-process measurements of the pieces. The post-process measurement is carried out by using the same in-process measurement means, with the provision of different zero references for the two types of measurements.

8 Claims, 2 Drawing Sheets

METHOD FOR CONTROLLING THE MACHINING OF MECHANICAL PIECES

BACKGROUND OF THE INVENTION

1. Field of the Invention

The present invention relates to a method for controlling the machining of mechanical pieces in a machine tool, like a grinding machine, comprising the in-process measuring of the pieces in order to obtain a first measurement signal; the control of the machine tool as a function of the first measurement signal; the post-process measuring of the pieces in order to obtain a second measurement signal; and the correction of the first measurement signal depending on the value of the second measurement signal.

The invention also relates to an apparatus for carrying out said method.

2. Description of the Prior Art

It is known to control the machining of mechanical pieces in machine tools, more specifically in grinding machines, by means of one or more electronic measuring devices for measuring the dimensions of a piece while it is being machined ("in-process").

Generally, the measuring device consists of a comparator gauge that determines the deviation of a piece dimension from a nominal dimension with respect to which the gauge has been previously set to zero. For example, with reference to an external cylindrical grinding machine, the gauge determines the deviation of a piece outside diameter from a nominal value. As prefixed deviation values are met, the gauge controls the switching from a coarse grinding phase to a fine finishing phase, and then to a "sparkout" phase (machining without any radial feed occurring between the grinding wheel and the piece, whereby there is an—at least partial—elimination of the previously accumulated deformations and strains), and finally, when the nominal diameter size is reached, the grinding wheel withdrawal from the piece.

In general, the gauge is retracted by a slide, in order to facilitate the unloading of a machined piece and the loading of a new piece.

It is also known to arrange a master or standard piece in the machine so that, when the slide retracts the gauge, the latter gauges the master, so as to detect any possible deviations from the zero-setting condition. These deviations can be used to correct the signal provided by the gauge during the in-process operation.

However, even under the circumstance that the in-process gauge always remain perfectly zero-set against the master piece, the final dimensions of the machined pieces might vary because, for example, the working conditions and the machine response time are subject to drifts and other alterations. It is also known, to correct the measurement signal provided by an in-process gauge, i.e. the zero-setting of the in-process gauge, by means of a "post-process" gauge. The post-process gauge is installed at the machine output, in order to check the machined piece after it has been unloaded from the working position and placed in a post-process measuring station.

The post-process gauge usually provides more accurate and repeatable measurements, with respect to an in-process one, because the post-process measuring station is unaffected by disturbances originated by the grinding wheel pressure against the piece, the grinding wheel rotation, the coolant, etc. and is affected to a less extent by the variations in the piece temperature. In fact, the temperature of the pieces at the post-process station varies within a more restricted range with respect to the variations occurring during the machining operation; even the parts of the gauge, like in particular the movable arms of directly contacting gauges, in the post-process applications cause minor thermal drifts.

The main advantages in the use of the post-process gauges consist—apart from the high accuracy and repeatability and the possibility of compensating, at least partially, any variations in the functioning of the grinding machine—in the elimination or at least the reduction of the periodic operations for testing the zero-setting conditions of the in-process gauge with respect to a master piece, arranged either on or off the machine. Consequently, the down-times of the grinding machine are reduced.

However, the use of one or more post-process gauges obviously implies considerable additional expenses, due to the provision of a post-process gauge itself (measuring head and associated amplifier), of a measuring station (mechanical references for the piece) and to a more complex piece handling.

SUMMARY OF THE INVENTION

The object of the present invention is to reach a favorable compromise among the known checking methods.

The method of the present invention, for controlling the machining of mechanical pieces in a machine tool, like a grinding machine, comprises the steps of in-process measuring the pieces by measurement means in order to obtain a first measurement signal; a first comparing step, for comparing the first measurement signal with a first reference; controlling the machine tool depending on the result of the first comparing step; post-process measuring the pieces by the same measurement means used for in-process measuring, in order to obtain a second measurement signal; a second comparing step for comparing the second measurement signal with a second reference; and correcting the first reference depending on said second comparing step.

According to the invention, an apparatus for controlling a machine tool, like a grinding machine, comprises measuring means for in-process and post-process checking a dimension of a piece and control means connected to the measuring means for controlling the machine tool, the measuring means basically including a measuring head and an electronic amplifier connected to the measuring head and adapted to provide a first measurement signal relating to the in-process checking and a second measurement signal relating to the post-process checking, the electronic amplifier defining distinct electronic references for the in-process and post-process checking, respectively.

The inventions permits controlling of the machining operation in a prompt and reliable way, like that which would be obtained by using an in-process and a post-process gauge, but with a high reduction of costs.

There is obtained the economical advantage of employing just one gauge and the technical advantage of evaluating and correcting, without any separate post-process station, errors due to changes in the response of the machine tool.

The piece can be measured after the machining, when it is still in the working position. However, the measurement taking occurs after the grinding wheel withdrawal, possibly after the interruption of the coolant flow and the elapsing of some time, even if short, so as to enable a considerable thermal balancing. Consequently, even though this post-process measurement does not occur under the more favorable conditions that would be obtained by a separate post-process station, it is surely more accurate and repeatable than the in-process measurement.

By introducing a master piece measuring operation too, to be carried out by the same measuring device, it is also possible to evaluate and correct errors due to the measuring device drifts.

BRIEF DESCRIPTION OF THE DRAWINGS

The invention is now described in detail with reference to the accompanying drawings, which show preferred embodiments, and in which.

DESCRIPTION OF THE PREFERRED EMBODIMENTS

Figure 1:
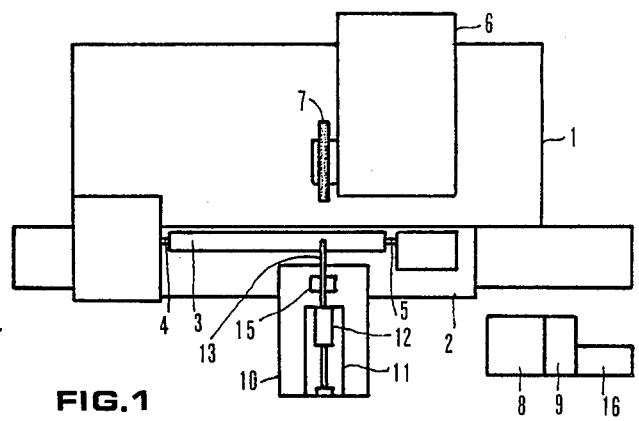
FIG. 1 is a plan diagram of a grinding machine equipped with an apparatus according to the invention.

In FIG. 1 there is shown an external cylindrical grinding machine comprising a bed 1, a longitudinal slide 2 that carries a piece 3 between a live center 4 and a dead center 5, a radial slide 6 carrying a grinding wheel 7, and a cabinet containing a computerized numeric control 8 and a programmable controller 9.

A support 10 fixed to bed 1 carries a hydraulically or electrically operated slide 11 whereupon there is installed a measuring head 12 of an electronic gauge. Head 12 has two movable arms 13 and 14 (also refer to FIG. 2) that bear at their ends feeler elements adapted for contacting diametrically opposite points of piece 3.

On support 10 there is mounted a standard or master piece 15 whose diameter is the same as the nominal one of pieces 3 to be machined, or that differs of a known value from the nominal diameter. The master 15 is positioned in such a way that when slide 11 retracts head 12, the feelers of the movable arms 13 and 14 place themselves in a measuring position on the Piece 15.

The grinding machine also comprises actuation motors, transducers associated to slides 2 and 6 and other known devices.

Generally, the configuration described up to now is of a well known type and consequently it is not commented any further.

Figure 2:
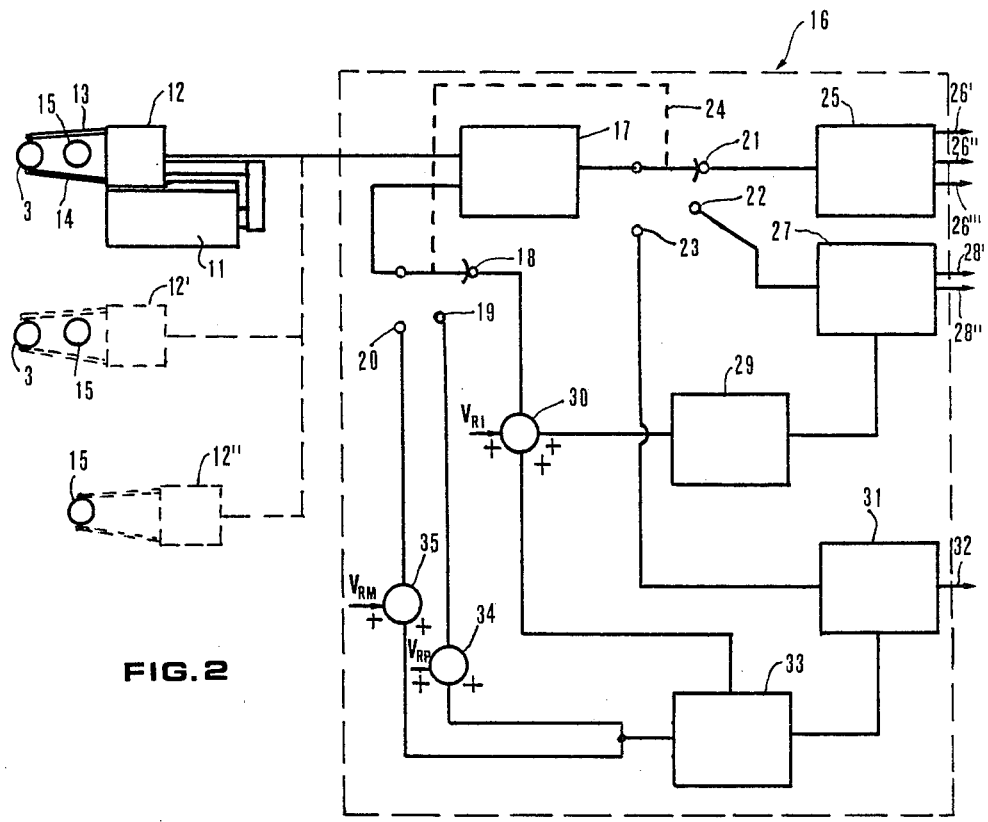
FIG. 2 is a partial block diagram that regards an electronic gauge of the apparatus shown in FIG. 1 and its associated amplifier.

Measuring head 12 is connected to an amplifier 16, shown in the functional diagram in FIG. 2.

The output signal of head 12 reaches an input of a detector-comparator circuit 17 with another input that can switch over three terminals 18, 19 and 20. The output of the detector-comparator circuit 17 can switch over other three terminals 21, 22 and 23. The switching over terminals 18-23 occurs simultaneously, as indicated by the dashed line 24, so that at the second input and at the output of the comparator circuit 17 there are connected terminals 18, 21; 19, 22; and 20, 23, respectively.

Terminal 21 is connected to the input of a unit 25 that contains measurement processing circuits, among which are various comparators, in order to provide control signals at corresponding prefixed values of the input signal. The control signals, indicated by 26', 26", 26''', etc. reach the programmable controller 9 and control the various phases of the machining cycle of piece 3 (for example coarse grinding, finishing, sparkout, end of the machining cycle).

Terminal 22 is connected to the input of a circuit 27 that has outputs 28', 28", etc. which provide control signals for the selection of pieces 3 according to their dimensions at the end of the machining operation and another output connected to a memory circuit 29.

The output of the memory circuit 29 is connected to a summing circuit 30 whose output is in turn connected to terminal 18.

Terminal 23 is connected to the input of a comparator circuit 31 that has an output 32 to monitor anomalous conditions regarding, more specifically, the gauging head 12.

Another output of circuit 31 is connected to a memory circuit 33 that can calculate and memorize simultaneously various correction signals that reach relevant inputs of summing circuit 30 and of other two summing circuits 34 and 35.

Normally, as shown in FIG. 2, the correction signals at the inputs of the summing circuits 34 and 35 are identical.

Summing circuits 30, 34 and 35 have further inputs whereto there can be applied reference voltages $V_{RI}$, $V_{RP}$, $V_{RM}$ settable by means of potentiometers, not shown, during an initial zero-setting operation. The outputs of the summing circuits 34, 35 are connected to terminals 19 and 20, respectively.

Figure 3:
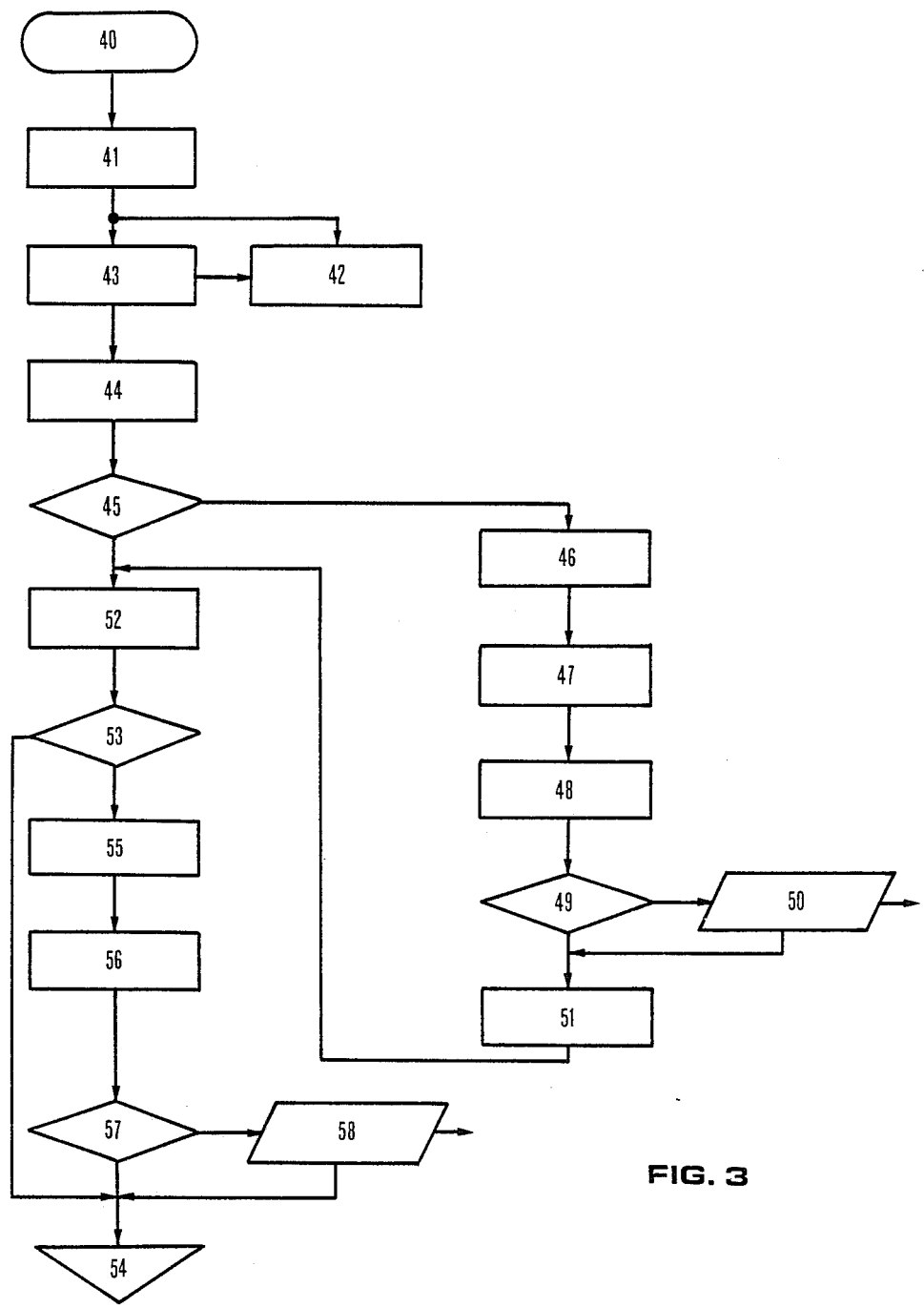
FIG. 3 is a flow diagram illustrating the checking method according to the present invention and the functioning of the apparatus shown in FIGS. 1 and 2.

The control method according to the invention and the operation of the apparatus shown in FIGS. 1 and 2 are now described with reference to the flow diagram shown in FIG. 3.

After the cycle start (40) and the loading of a new piece 3 between the centers 4 and 5 in the working position (41), the machining begins (42), and is controlled (43) by means of the in-process head, indicated by reference number 12 in FIG. 2. More specifically, signals 26', 26", etc. control the starting of the various phases and the ending of the stock removal cycle.

Consequently, there are controlled (44) the withdrawal of grinding wheel 7 and head 12 from piece 3 and the interrupting of the coolant jet against piece 3. Block 45 in FIG. 3 refers to two alternatives that can be programmed on an appropriate keyboard of amplifier 16 and/or selected by means of external signals from the numeric control 8 or the programmable controller 9, for the execution or not of a post-process check on the already machined piece 3.

Should a post-process check be programmed in this phase, slide 11 makes the gauging head—indicated by reference number 12' in FIG. 2—, advance again (46) towards piece 3, the second input and the output of the detector-comparator circuit 17 are switched over terminals 19 and 22 and consequently the measurement of the diameter of piece 3 is carried out (47), depending on which (48) selection controls (outputs 28', 28" ... in FIG. 2) can be obtained and a processing, per se known, of a plurality of post-process measurements on the following pieces is made. Depending on the measurement and on the processing, there can be provided or not (49) a correction signal that is memorized buy circuit 29 and reaches, through summing circuit 30, terminal 18. Consequently, the zero reference of the in-process measurement can be corrected (50) depending on one or more post-process measurements and a statistical and/or percentage type processing.

Slide 11 is then actuated (51) to retract the gauging head, bringing it to the position shown by 12" in FIG. 2. When the post-process check ends, piece 3 is picked up (52) and possibly selected by an automatic handling device, not shown.

Block 53 refers to two further alternatives that can be programmed on the keyboard of amplifier 16 and/or selected by means of external signals, to accomplish or not a check on master piece 15. If this check is not enabled, the cycle ends, as indicated by block 54.

On the contrary, if the checking of master piece 15 is enabled (for example it can be foreseen to accomplish this check after a prefixed number of cycles, or when the post-process checking detects anomalous measurements), the second input and the output of the detector-comparator circuit 17 switch over terminals 20 and 23 and consequently the measuring of master piece 15 is carried out (55). It is obvious that, as the dimensions of master piece 15 are substantially invariable and head 12 (in position 12") is zero-set beforehand on master piece 15 by setting an appropriate value of $V_{RM}$ at the input of summing circuit 35, any possible measurement deviations from zero value indicate a drift or other irregularities in the operation of head 12". If the deviation entity exceeds a prefixed value, an alarm signal is provided at output 32.

In circuit 33, the measurement deviations relating to the successive checks of master piece 15 are processed (56) and correction signals can or not be applied (57). So, for example, there are not applied correction signals of an entity less than or equal to the measurement dispersion of head 12.

In the event corrections are controlled (58), they are applied to relevant inputs of the summing circuits 30, 34 and 35, in a way as to correct the zero-settings relating to the in-process, post-process and master piece 15 measurements. Then, the cycle ends (54).

Obviously, amplifier 16 exchanges with the numeric computerized control 8 and programmable controller 9 other signals or controls, apart from those indicated, for example signals for the actuation of slide 11 and the switching of contacts 18–23. Furthermore, it should be realized that the block diagram in FIG. 2 refers more to the functions than to the structure of amplifier 16, that can be advantageously manufactured by employing microprocessors and digital circuits, so as to enable an easy and powerful programming and an immediate interfacing with the numeric control 8 and programmable controller 9.

The processing of the measurement signal deviations for obtaining correction signals can be of various types and programmable in such a way as to privilege, according to the cases, the stability, the promptness, the reduction of idle time, etc.

Thus, corrections can be controlled as a function of average procesings, the exceeding of pre-alarm values for a certain number of consecutive measurements, programmed percentages of the detected deviations, etc.

It is possible to reduce the machine idle time by foreseeing for the machined piece 3 a reference system, arranged in proximity of centers 4 and 5 and master piece 15, in order to accomplish a post-process measurement by the same head 12 and so proceed with the loading of a new piece 3 in the working position while the already machined piece 3 is measured. To this purpose, head 12 may have sufficiently long movable arms 13 and 14 and there will be provided references for defining an appropriate intermediate position of slide 11.

It is obvious that the invention can be applied even when other additional dimensions on the same piece have to be checked. For example, for checking two diameters and the taper error in external grinding machines, there can be used two gauging heads suitable for checking relevant piece dimensions both during as well as after the machining and measuring relevant sections of one or two masters.

It is also possible to foresee measurements and associated post-process processings of a type and/or in a number that differ from the in-process ones and foresee machine tool feedback controls independent from the type of in-process check.

Furthermore, the invention can be applied to other types of grinding machines or different machine tools.

What is claimed is:

1. A method for controlling the machining of mechanical pieces in a machine tool, like a grinding machine, comprising the steps of in-process measuring the pieces by measurement means in order to obtain a first measurement signal; a first comparing step, for comparing the first measurement signal with a first reference; controlling the machine tool depending on the result of the first comparing step; post-process measuring the pieces by the same measurement means used for in-process measuring, in order to obtain a second measurement signal; a second comparing step for comparing the second measurement signal with a second reference; and correcting the first reference depending on said second comparing step.

2. The method according to claim 1, further comprising the steps of measuring a master piece by means of said measurement means in order to obtain a third measurement signal, and correcting said first and second references depending on the third measurement signal.

3. The method according to claim 2, wherein said master piece is arranged in the machine and the first and the second references are automatically corrected.

4. The method according to claim 1, wherein the post-process measuring of the pieces occurs when the piece is in the working position.

5. The method according to claim 4, for controlling a grinding machine including a grinding wheel, further comprising the step of withdrawing the grinding wheel before the step of post-process measuring the pieces.

6. The method according to claim 5, wherein a coolant jet is directed against the pieces during grinding, further comprising the step of interrupting the coolant jet before the step of post-process measuring the pieces.

7. The method according to claim 1, wherein the post-process measuring of the pieces occurs by placing the piece near the machining position.

8. The method according to claim 7, wherein during the measuring of a machined piece, another piece is loaded in the machining position.

* * * * *